United States Patent
Jung et al.

(10) Patent No.: US 9,801,191 B2
(45) Date of Patent: Oct. 24, 2017

(54) RESOURCE ALLOCATION METHOD FOR SUPPORTING INTERFERENCE REMOVAL, AND SERVING CELL BASE STATION

(71) Applicant: LG ELECTRONICS INC., Seoul (KR)

(72) Inventors: Manyoung Jung, Seoul (KR); Sangwook Lee, Seoul (KR); Jinyup Hwang, Seoul (KR); Yoonoh Yang, Seoul (KR); Suhwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 213 days.

(21) Appl. No.: 14/758,125

(22) PCT Filed: Jan. 17, 2014

(86) PCT No.: PCT/KR2014/000513
§ 371 (c)(1),
(2) Date: Jun. 26, 2015

(87) PCT Pub. No.: WO2014/112825
PCT Pub. Date: Jul. 24, 2014

(65) Prior Publication Data
US 2015/0358974 A1   Dec. 10, 2015

Related U.S. Application Data

(60) Provisional application No. 61/753,945, filed on Jan. 18, 2013.

(51) Int. Cl.
*H04W 4/00* (2009.01)
*H04B 7/216* (2006.01)
(Continued)

(52) U.S. Cl.
CPC ....... *H04W 72/082* (2013.01); *H04J 11/0056* (2013.01); *H04L 1/0003* (2013.01);
(Continued)

(58) Field of Classification Search
CPC ..... H04B 7/024; H04B 7/0628; H04B 7/0452
See application file for complete search history.

(56) References Cited

U.S. PATENT DOCUMENTS

| 6,434,380 | B1 * | 8/2002 | Andersson | H04W 4/24 |
| | | | | 379/114.01 |
| 2008/0049813 | A1 * | 2/2008 | Kurose | H04L 1/0016 |
| | | | | 375/141 |

(Continued)

FOREIGN PATENT DOCUMENTS

| KR | 10-2011-0028653 | 3/2011 |
| KR | 10-2012-0062833 | 6/2012 |

(Continued)

OTHER PUBLICATIONS

PCT International Application No. PCT/KR2014/000513, Written Opinion of the International Searching Authority dated Apr. 25, 2014, 1 page.

*Primary Examiner* — Melanie Jagannathan
(74) *Attorney, Agent, or Firm* — Lee Hong Degerman Kang Waimey

(57) ABSTRACT

One embodiment of the present specification provides a method for resource allocation by a serving cell base station, for supporting interference removal. The resource allocation method may comprise the steps of: determining whether or not UE has an interference removal function; and if the UE has the interference removal function, allocating resource blocks (RB) to the UE through a negotiation with an interfering cell with respect to the allocation of the resource blocks (RB). Herein the resource blocks (RB) of the interfering cell, which are co-located with the resource blocks (Continued)

(RB) according to the negotiation, may be allocated to another UE by the interfering cell without being divided.

10 Claims, 18 Drawing Sheets

(51) Int. Cl.
    *H04W 72/08*     (2009.01)
    *H04L 1/00*     (2006.01)
    *H04W 72/04*     (2009.01)
    *H04J 11/00*     (2006.01)
    *H04L 5/00*     (2006.01)
    *H04W 88/08*     (2009.01)
    *H04W 88/02*     (2009.01)

(52) U.S. Cl.
    CPC .......... *H04L 5/0032* (2013.01); *H04L 5/0069* (2013.01); *H04L 5/0073* (2013.01); *H04W 72/048* (2013.01); *H04W 88/02* (2013.01); *H04W 88/08* (2013.01)

(56) References Cited

U.S. PATENT DOCUMENTS

| | | | | |
|---|---|---|---|---|
| 2009/0069023 A1* | 3/2009 | Ahn | ............... | H04L 5/0007 455/450 |
| 2010/0099449 A1* | 4/2010 | Borran | ............... | H04W 52/243 455/501 |
| 2010/0184447 A1* | 7/2010 | Miki | ............... | H04L 5/0007 455/450 |
| 2011/0002285 A1* | 1/2011 | Kim | ............... | H04L 5/0007 370/329 |
| 2012/0026955 A1* | 2/2012 | Benjebbour | ........... | H04B 7/024 370/329 |
| 2012/0115521 A1* | 5/2012 | Tong | ............... | H04W 16/14 455/501 |
| 2012/0127952 A1* | 5/2012 | Tong | ............... | H04B 7/0408 370/330 |
| 2012/0178484 A1* | 7/2012 | Liu | ............... | H04J 11/0053 455/513 |
| 2013/0005269 A1* | 1/2013 | Lindoff | ............... | H04J 11/0026 455/63.1 |
| 2013/0094547 A1* | 4/2013 | Kang | ............... | H04B 15/00 375/219 |
| 2013/0114447 A1* | 5/2013 | Luo | ............... | H04B 1/7103 370/252 |
| 2014/0135028 A1* | 5/2014 | Wang | ............... | H04J 11/004 455/452.2 |
| 2015/0139004 A1* | 5/2015 | Fodor | ............... | H04W 72/082 370/252 |

FOREIGN PATENT DOCUMENTS

| | | |
|---|---|---|
| KR | 10-2012-0123997 | 11/2012 |
| WO | 2010/006300 | 1/2010 |
| WO | 2011/025772 | 3/2011 |
| WO | 2011/040726 | 4/2011 |
| WO | 2011/159072 | 12/2011 |

\* cited by examiner

RESOURCE ALLOCATION METHOD FOR SUPPORTING INTERFERENCE REMOVAL, AND SERVING CELL BASE STATION

CROSS-REFERENCE TO RELATED APPLICATIONS

This application is the National Stage filing under 35 U.S.C. 371 of International Application No. PCT/KR2014/000513, filed on Jan. 17, 2014, which claims the benefit of U.S. Provisional Application No. 61/753,945, filed on Jan. 18, 2013, the contents of which are all hereby incorporated by reference herein in their entirety.

BACKGROUND OF THE INVENTION

Field of the Invention

The present disclosure relates to a resource allocation method for supporting interference removal, and a serving cell base station.

Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

In recent years, there is an ongoing discussion on 3GPP LTE-advanced (LTE-A) evolved from the 3GPP LTE.

Also, recently, a heterogeneous network in which a macro cell and a small cell coexist are under discussion. In particular, discussions for bypassing traffic by distributing a terminal connected to a macro cell to a small cell are in progress.

Meanwhile, interference may further increase due to such a small cell, and thus, interference removal capability (or an interference cancellation capability) is urgently required.

SUMMARY OF THE INVENTION

The present invention provides a method for resource allocation to effectively remove interference, and a serving cell base station.

To achieve the above objects, the present disclosure provides a resource allocation method of a serving cell base station for supporting interference cancellation. The resource allocation method may comprise: determining whether a terminal has an interference cancellation capability; and when the terminal has an interference cancellation capability, allocating resource blocks (RBs) to the terminal through negotiation with an interference cell regarding the allocation of the resource blocks. Here, resource blocks of the interference cell in the same positions as those of the resource blocks according to the negotiation may be allocated, without being divided, to other single terminal.

The method may further comprise: determining whether the terminal is located in a cell boundary. Here, the negotiating with the interference cell is performed when the terminal is located in the cell boundary.

In the negotiation with the interference cell, information regarding positions of the resource blocks to be allocated by the serving cell base station to the terminal may be transmitted to the interference cell. Here, the resource blocks of the interference cell in the same positions as those of the resource blocks to be allocated to the terminal may be allocated, without being divided, to the other single terminal. When a plurality of terminals to which the interference cell is to allocate resource exist, the other single terminal having the lowest level of modulation coding scheme (MCS), among the plurality of terminals, may be selected by the interference cell and the resource blocks of the interference cell in the same positions may be allocated thereto.

The allocating of resource blocks through a negotiation with the interference cell may comprise: transmitting, by the serving cell base station, information regarding the number of resource blocks to be allocated to the terminal, to the interference cell; receiving, by the interference cell, information regarding positions of the resource blocks allocated by the same number to the other single terminal; and allocating the resource blocks present in the positions recognized by the received information to the terminal. Here, when a plurality of terminals to which the interference cell is to allocated the same number of resource blocks exist, the other single terminal having the lowest level of MCS, among the plurality of terminals, may be selected by the interference cell.

The method may further comprise: requesting, by the serving cell, the terminal to check capability information thereof; and receiving capability information from the terminal. Here, the received capability information includes information indicating whether the terminal has the interference cancellation capability.

To achieve the above objects, the present disclosure provides a serving cell base station for allocating resource to support interference cancellation. The serving cell base station may comprise: a radio frequency (RF) unit; and a processor configured to control the RF unit. The processor may determine whether a terminal has an interference cancellation capability. When the terminal has the interference cancellation capability, the processor may allocate resource blocks to the terminal through a negotiation with the interference cell about the allocation of the resource blocks. Here, resource blocks of the interference cell in the same positions as those of the resource blocks according to the negotiation may be allocated, without being divided, to other single terminal.

According to the disclosure of the present specification, a serving cell allocates resource such that a terminal may effectively remove interference. Thus, the terminal may have enhanced reception performance through the interference removal capability.

DESCRIPTION OF EXEMPLARY EMBODIMENTS

Figure 1:
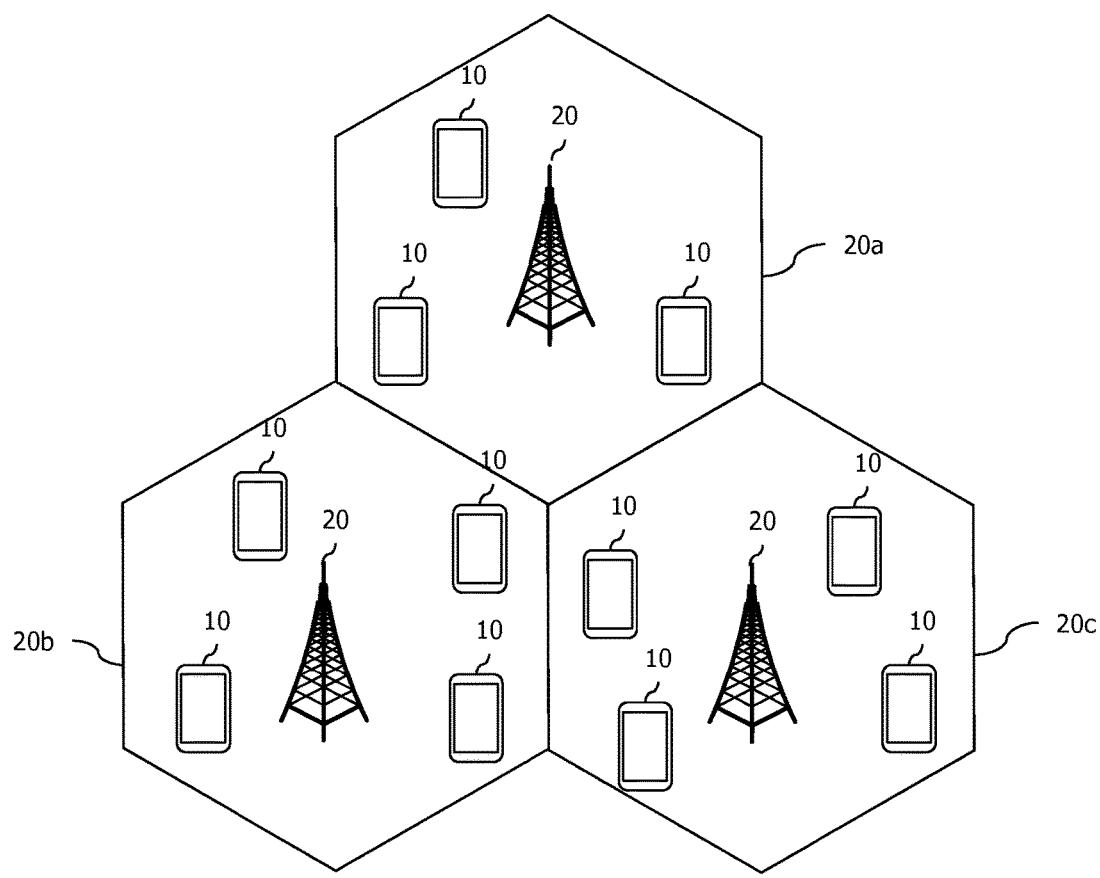
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
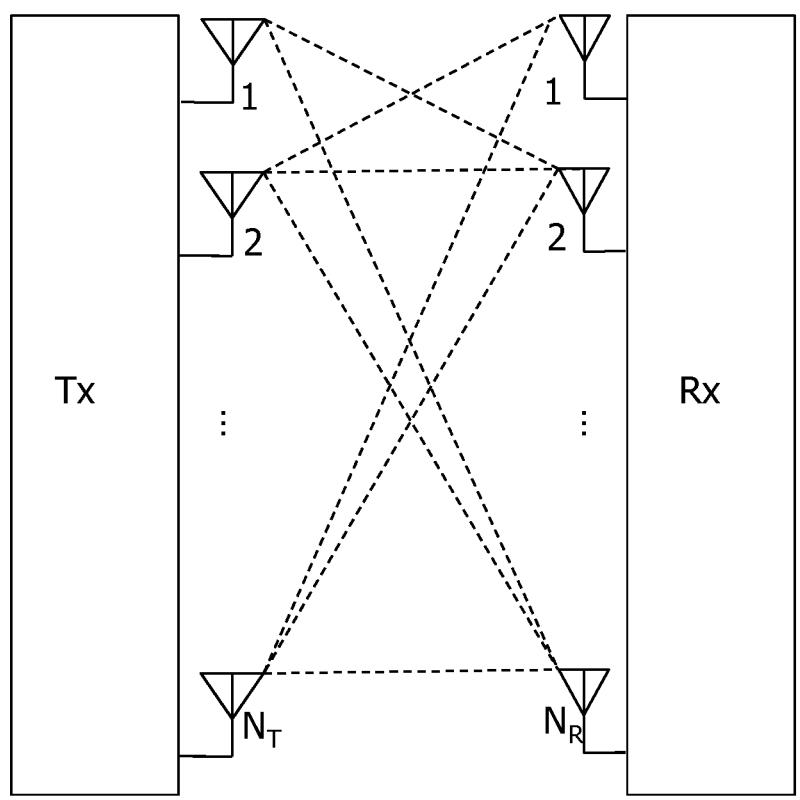
FIG. 2 is a view illustrating an antenna configuration of a multi-antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below.

$$R_i = \min(N_T, N_R) \qquad \text{[Equation 1]}$$

Transmission information may include a maximum of $N_T$ number of different information items when the number of transmit antennas is $N_T$.

$$s = [s_1, s_2, \ldots, s_{N_T}]^T \qquad \text{[Equation 2]}$$

In Equation 2, s denotes transmission information vector, and $s_1, s_2, \ldots, s_{NT}$ denotes information items as elements of the transmission information vector. Each of the information items may be transmitted with different transmission power. When each transmission power is denoted as $(P_1, P_2, \ldots, P_{NT})$, the transmission information vector to which transmission power is applied may be expressed as Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Equation 3 may be expressed as the product of a transmission power diagonal matrix and the transmission information vector.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

A weight matrix is multiplied to the transmission information vector with transmission power applied thereto to generate transmission signals $(x_1, x_2, \ldots, x_{NT})$ transmitted through the actual $N_T$ number of transmission antennas. The weight matrix W serves to appropriately distribute transmission information to individual antennas according to a transmission channel situation. When a transmission signal vector is x, x may be expressed as Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, an element $w_{ij}$ ($1 \le i \le N_T$, $1 \le j \le N_T$) of the weight matrix denotes a weight value for ith transmission antenna and jth transmission information. The weight matrix W is also called a precoding matrix.

The transmission signal vector may include different transmission information according to a transmission technique. For example, when space diversity, i.e., transmission diversity, is applied, all of transmission information of transmission signal vectors may be the same. That is, [$s_1$, $s_2$, ..., $s_{nT}$] may be the same information, for example, [$s_1$, $s_1$, ..., $s_1$]. Thus, since the same transmission information is transmitted to a received through different channels, a diversity effect is obtained and reliability of transmission increases.

Or, when space multiplexing is applied, all of transmission information of transmission signal vectors may be different. That is, $s_1$, $s_2$, ..., $s_{nT}$ may be different information. Since different transmission information is transmitted to a receiver through different channels, an amount of transmittable information may increase.

Also, transmission information may be transmitted using both space diversity and space multiplexing. That is, in the foregoing example, the same information may be transmitted through three transmission antennas by space diversity, while different information may be transmitted through the other remaining transmission antennas by space multiplexing. In this case, the transmission information vector may be configured as [$s_1$, $s_1$, $s_1$, $s_2$, $s_3$ ..., $s_{nT-2}$], for example.

When a receiver has $N_R$ number of reception antennas, signals received by the individual reception antennas may be expressed as $y_n (1 \le n \le N_R)$. Here, the reception signal vector y may be expressed as Equation 6 below.

$$y = [y_1, y_2, \ldots, y_{N_R}]^T \qquad \text{[Equation 6]}$$

When channel remodeling is performed in a MIMO system, channels may be discriminated by an index of a transmission antenna and an index of a reception antenna. When the index of the transmission antenna is j and the index of the reception antenna is I, a channel between the transmission antenna and the reception antenna may be expressed as $h_{ij}$ (An attention should be paid to the fact that the index of the reception antenna is first expressed and the index of the transmission antenna is expressed later in the subscript expressing the channel).

Figure 3:
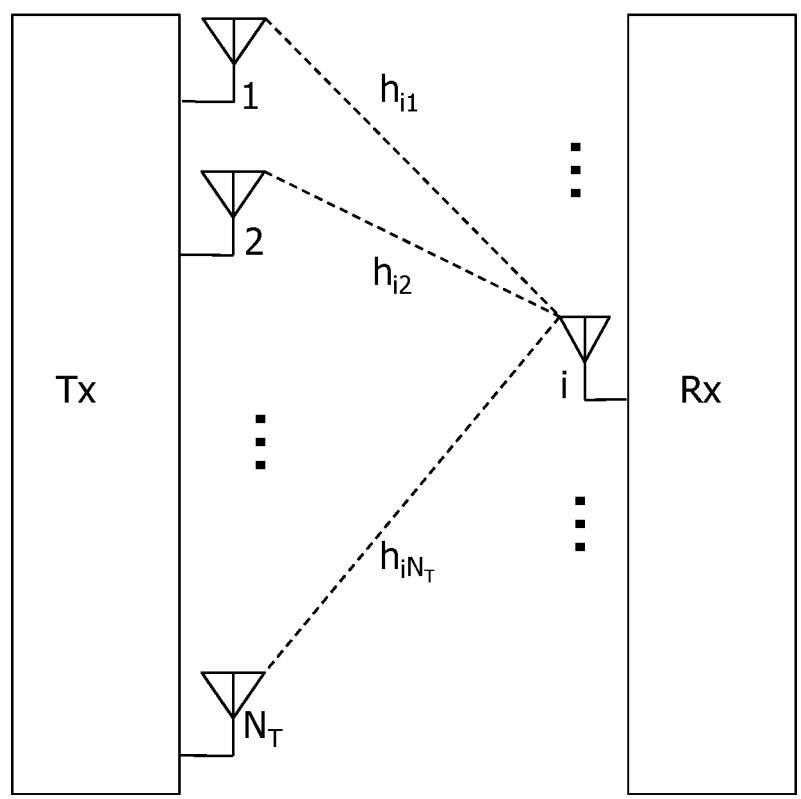
FIG. 3 is a view illustrating an example of a channel in the multi-antenna system.

FIG. 3 is a view illustrating a channel in a multi-antenna system.

Referring to FIG. 3, channels with respect to $N_T$ number of transmission antennas and a reception antenna I are expressed as $h_{i1}$, $h_{i2}$, ..., $h_{iNT}$, respectively. For the sake of convenience, these channels may be expressed as a matrix or a vector. The channels may be expressed in the form of vector in Equation 7 below.

$$h_i^T = [h_{i1}, h_{i2}, \ldots, h_{iN_T}]$$ [Equation 7]

When a matrix form of all the channels from $N_T$ number of transmission antennas to $N_R$ number of reception antennas is a channel matrix H, the channel matrix H may be expressed as Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$ [Equation 8]

Signals transmitted through the transmission antennas may be received by the reception antennas through the channels expressed in Equation 8. Here, noise is added in the actual channels. Such noise may be considered as additive white Gaussion noise (AWGN) mathematically. When AWGN added to the reception antennas is expressed as $n_1$, $n_2, \ldots, n_{NR}$, the AWGN may be expressed as a vector of Equation 9 below for the sake of convenience.

$$n = n = [n_1, n_2, \ldots, n_{N_R}]^T$$ [Equation 9]

In consideration of the foregoing AWGN, the transmission signal vector x, and the channel matrix, a reception signal vector y received by the reception antennas may be expressed as Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

In the channel matrix H, the number of rows and the number of columns are determined depending on the number of transmission antennas and the number of reception antennas. In the channel matrix H, the number of columns is equal to the number of transmission antennas. Thus, the channel matrix H may be expressed as a $N_R \times N_T$ matrix.

In general, a rank of a matrix is defined by a smaller one among the number of independent rows and the number of independent columns. Thus, the rank of the matrix cannot be greater than the number of columns or the number of rows, and the rank of the channel matrix H may be determined as Equation 11 below.

$$\text{rank}(H) \leq \min(N_T, N_R)$$ [Equation 11]

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 4:
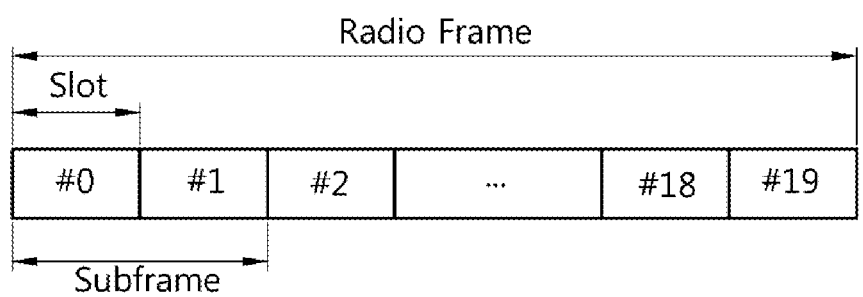
FIG. 4 is a view illustrating a structure of a radio frame according to FDD in a 3GPP LTE.

FIG. 4 illustrates the architecture of a radio frame according to FDD in 3GPP LTE.

Referring to FIG. 4, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 5:
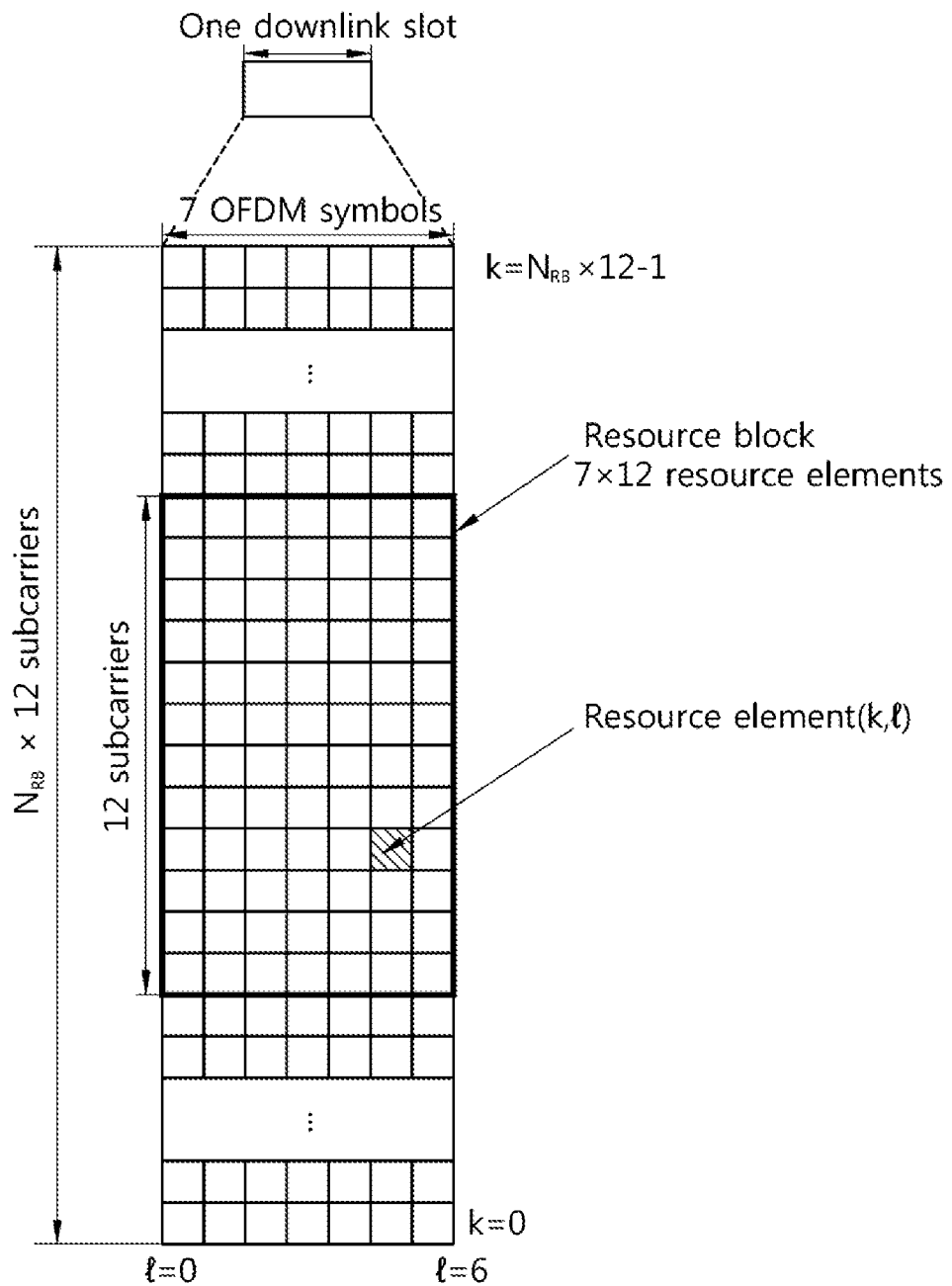
FIG. 5 is a view illustrating a resource grid regarding a single uplink or downlink slot in the 3GPP LTE.

FIG. 5 illustrates an example resource grid for one uplink or downlink slot in 3GPP LTE.

Referring to FIG. 5, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 6:
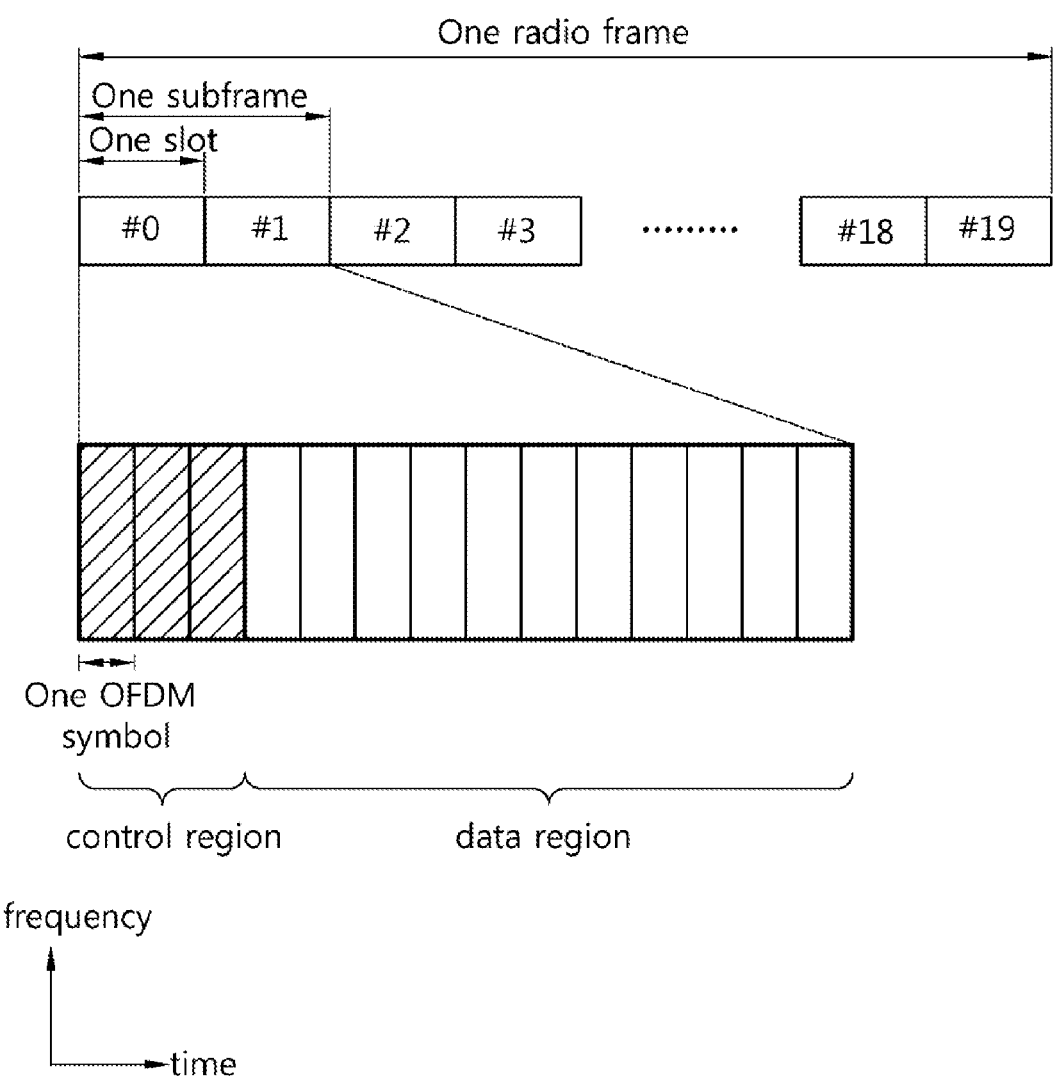
FIG. 6 is a view illustrating a structure of a downlink subframe.

FIG. 6 illustrates the architecture of a downlink subframe.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 7:
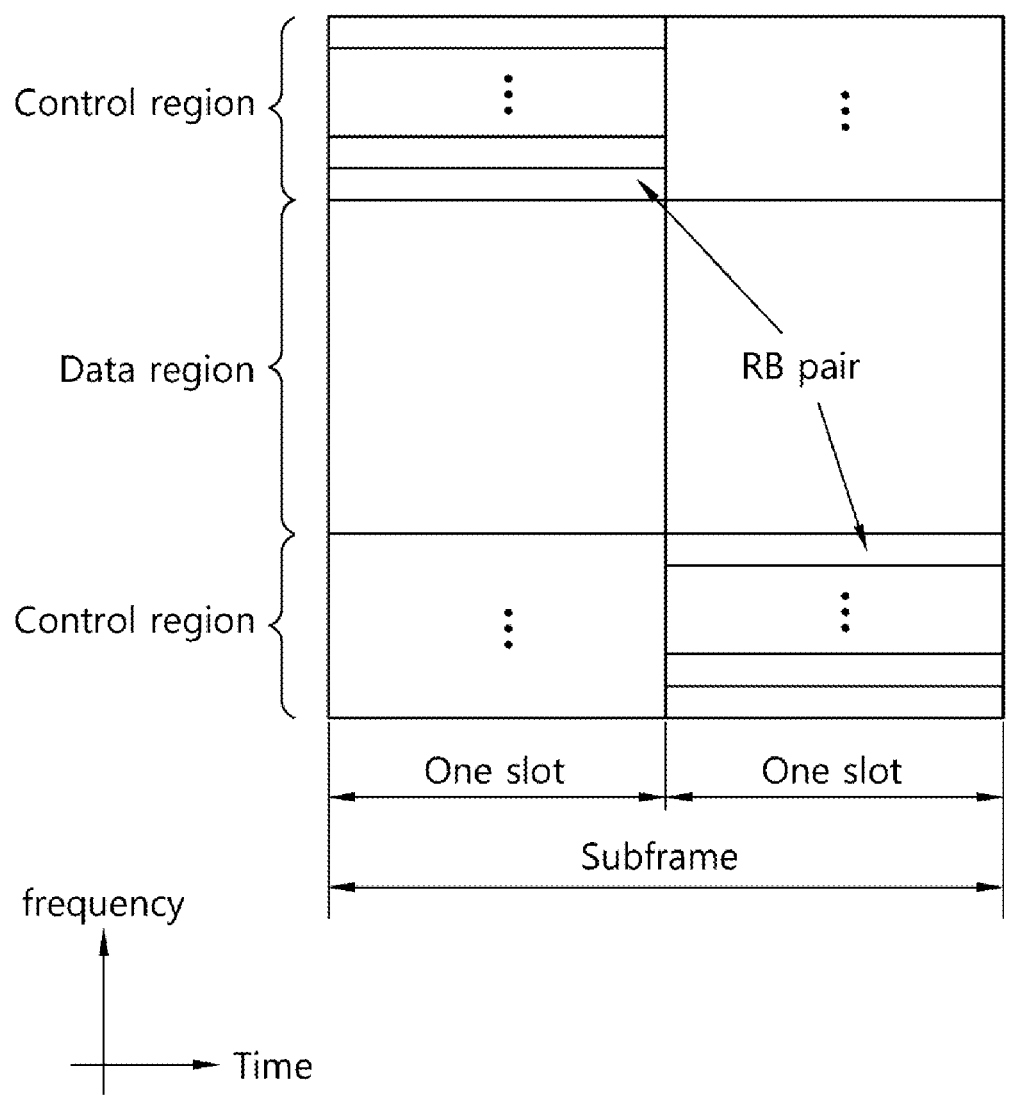
FIG. 7 is a view illustrating a structure of an uplink subframe in the 3GPP LTE.

FIG. 7 illustrates the architecture of an uplink sub-frame in 3GPP LTE.

Referring to FIG. 7, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 8:
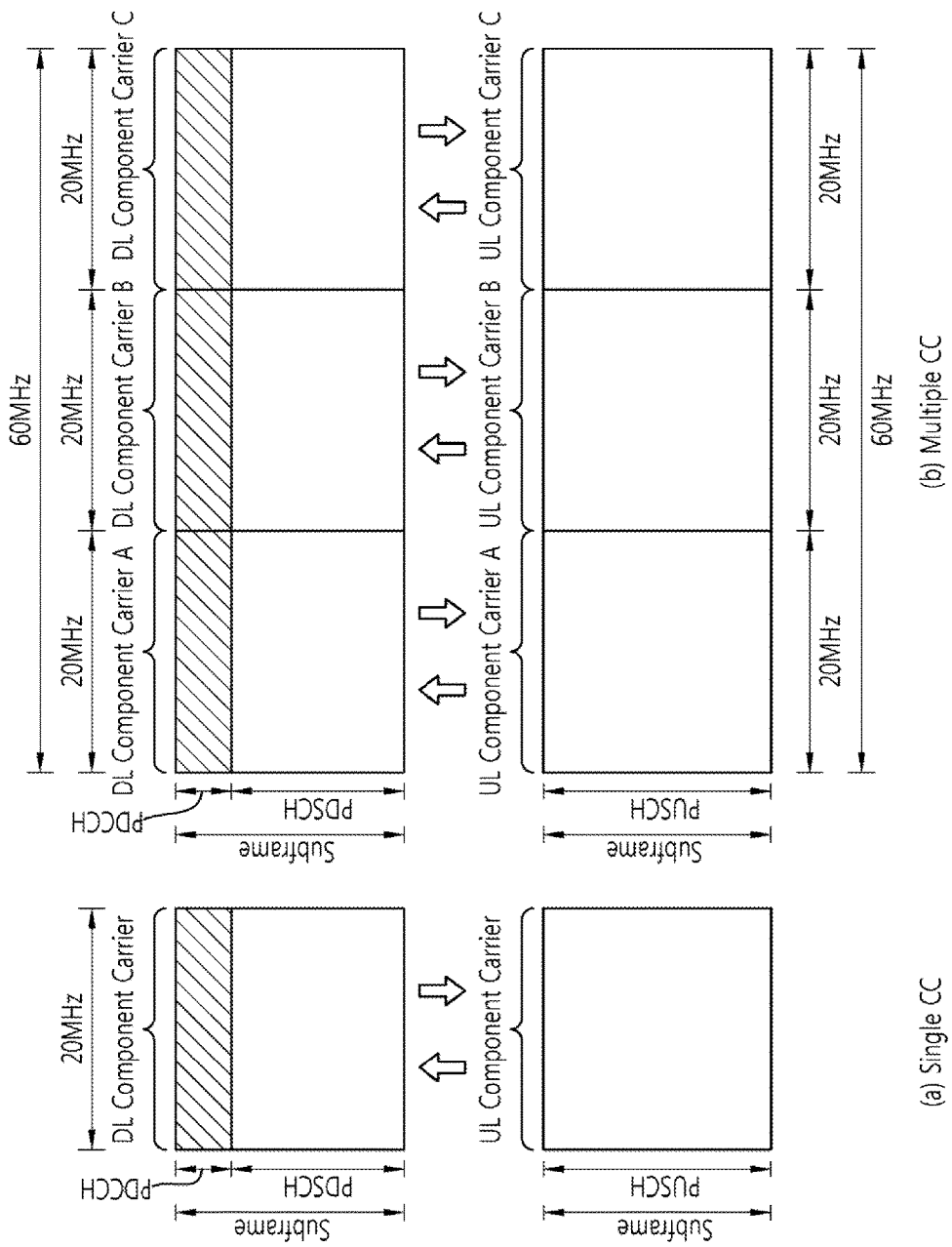
FIG. 8 is a view illustrating an example of comparison between an existing single carrier system and a carrier aggregation system.

FIGS. 8a and 8b illustrate an example of comparison between a single carrier system and a carrier aggregation system.

Referring to FIG. 8a, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 8a, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 8b may correspond to a communication example in an LTE-A system.

Referring to FIG. 8b, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 8b illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported.

Accordingly, the bandwidth of an uplink component carrier may be constituted like 5 MHz (UL CC0)+20 MHz (UL CC1)+20 MHz (UL CC2)+20 MHz (UL CC3)+5 MHz (UL CC4), for example. However, without consideration of backward compatibility, a new bandwidth may be defined rather the existing system bandwidth being used, to constitute a broadband.

FIG. 8b illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Hereinafter, a reference signal will be described.

In general, transmission information, for example, data, is easily distorted or changed while being transmitted through a wireless channel. Thus, in order to demodulate such transmission information without an error, a reference signal is required. The reference signal, a signal known in advance between a transmitter and a receiver, is transmitted together with the transmission information. The transmission information transmitted from the transmitter undergoes a channel corresponding to each transmission antennas or each layer, and thus, the reference signal may be allocated for each transmission antenna or each layer. The reference signal for each transmission antenna or each layer may be discriminated by using resource such as a time, a frequency, or a code. The reference signal may be used for two purposes, that is, demodulation of transmission information and channel estimation.

Reference signals may be divided into two types of reference signals depending on a range of a receiver which already knows about the reference signals. A first type of reference signal is a reference signal that only a specific receiver (for example, a specific terminal) knows, and such a reference signal is called a dedicated reference signal (DRS). In this context, the DRS is also called a UE-specific R. A second type of reference signal is a reference signal that every receiver, for example, every UE, knows, and such a reference signal is called a common reference signal (CRS). The CRS is also called a cell-specific RS.

Reference signals may also be classified according to purposes. For example, a reference signal used for demodulating data is called a demodulation reference signal (DM-RS). A reference signal used for feedback information indicating a channel state such as CQI/PMI/RI is called a channel state indicator-reference signal (CSI-RS). The foregoing DRS may be used as a DM-RS. Hereinafter, it is assumed that the DM-RS is a DRS.

Figure 9:
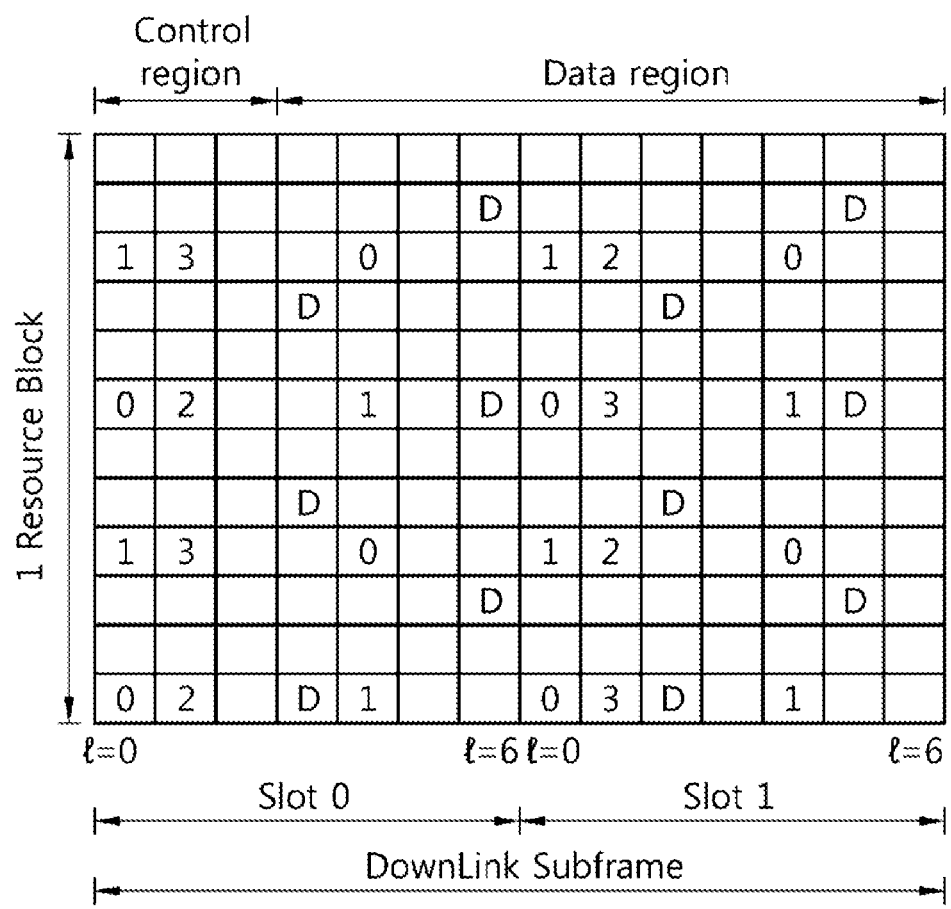
FIG. 9 is a view illustrating an example of an RS structure supporting four antenna ports in a normal CP.
Figure 10:
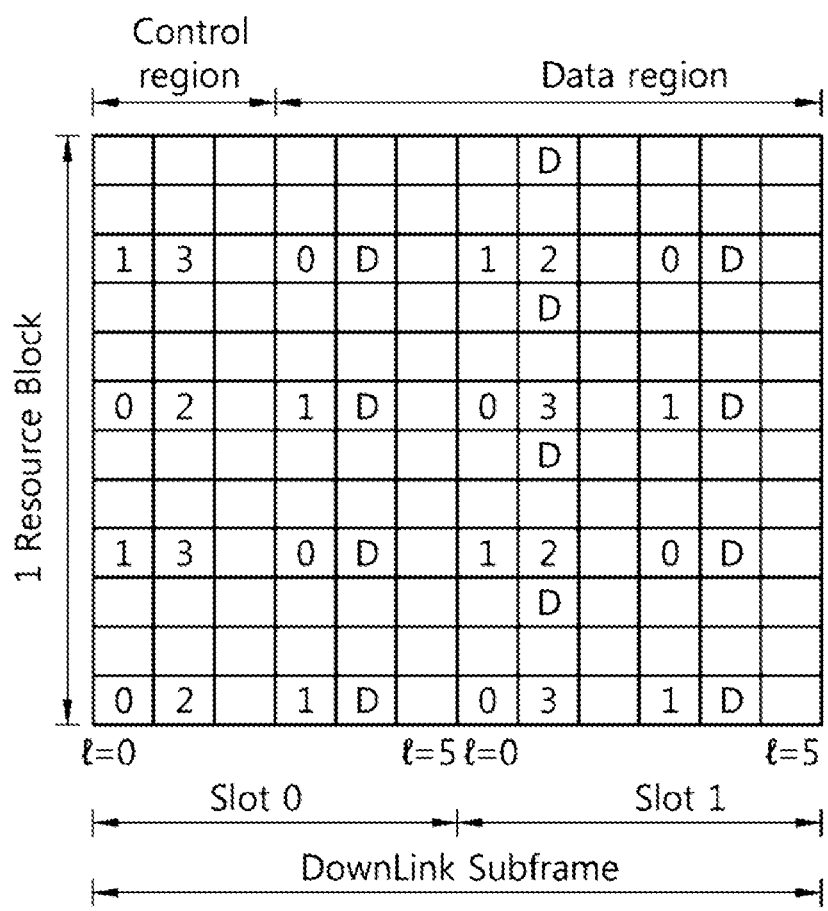
FIG. 10 is a view illustrating an example of an RS structure supporting four antenna ports in an extended CP.

FIG. 9 is a view illustrating an example of an RS structure capable of supporting four antenna ports in a normal CP. FIG. 10 is a view illustrating an example of an RS structure capable of supporting four antenna ports in an extended CP.

The RS structures of FIGS. 9 and 10 are those used in the related art 3GPP LTE system.

In FIGS. 9 and 10, resource elements in which any one of numbers from 0 to 3 are expressed indicate resource elements in which a cell-specific reference signal, i.e., a CRS, is transmitted. Here, any one of the numbers from 0 to 3 indicate a supported antenna port. That is, resource elements indicated by p (p is any one of 0 to 3) refer to resource elements to which a CRS with respect to an antenna port p is mapped. Such a CRS is used to perform channel measurement and data demodulation with respect to each antenna port. The CRS is transmitted in both a control region and a data region of a subframe.

In FIGS. 9 and 10, resource elements indicated by 'D' denote resource elements to which a UE-specific reference signal, i.e., a DRS, is mapped. The UE-specific RS may be used for transmission of a single antenna port of a PDSCH. A UE is instructed as to whether a UE-specific RS is transmitted through a higher layer signal, or as to whether a UE-specific RS is valid when a PDSCH is transmitted. The UE-specific RS may be transmitted only when data demodulation is required. The UE-specific RS may be transmitted only in a data region of a subframe.

Recently, a heterogeneous network in which a macro cell and a small cell coexist is under discussion. In particular, discussions for bypassing traffic by distributing a UE connected to a macro cell to a small cell are in progress.

Figure 11:
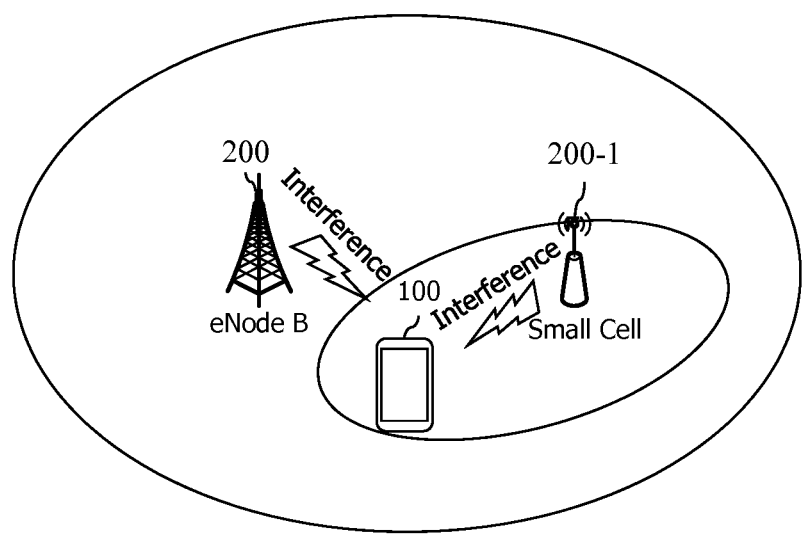
FIG. 11 is a view illustrating a heterogeneous network including a macro cell and a small cell.

FIG. 11 is a view illustrating a heterogeneous network including a macro cell and a small cell.

In a next-generation communication standard including a 3GPP LTE-A, a heterogeneous in which a small cell, for example, a pico cell, a femto cell, or a micro cell having low transmission power exist in an overlapping manner in existing macro cell coverage is under discussion.

Referring to FIG. 11, a macro cell may overlap one or more micro cells. A service of the macro cell is provided by a macro eNodeB (MeNB). In this disclosure, a macro cell and an MeNB may be mixedly used. A UE connected to the macro cell may be designated as a macro UE. The macro UE receives a downlink signal from the MeNB and transmits an uplink signal to the MeNB.

The small cell may also be designated as a femto cell, a pico cell, or a micro cell. A service of the small cell is provided by a pico eNodeB, a home eNodeB (HeNB), or a relay node (RN). For the purposes of description, the pico eNodeB, the HeNB, and the RN will be generally referred to as a home BS (HeNB). In this disclosure, a micro cell and the HeNB may be mixedly used.

In the heterogeneous network, since the macro cell and the small cell overlap, inter-cell interference may be problematic. As illustrated, when a UE is locate in a boundary between the macro cell and the small cell, a downlink signal from the macro cell may act as interference. Similarly, a downlink signal from the small cell may also act as interference.

For a specific example, when a UE 100 connected to a small cell 200-1 is located in the boundary of the small cell, the UE 100 may be disconnected from the small cell 200-1 due to interference from the macro cell 200, and this means that coverage of the small cell 200-1 is smaller than expected.

In another example, when the UE 100 connected to the macro cell 200 is in the region of the small cell 200-1, the UE 100 may be disconnected from the macro cell 200 due to interference from the small cell 200-1. This means that a shadow area is generated within the macro cell 200.

The most fundamental method for solve the interference problem is using different frequencies between heterogeneous networks. However, since a frequency is scarce and expensive resource, and thus, the solution based on frequency division is not welcomed to mobile carriers.

Thus, in 3GPP, such inter-cell interference is solved through time division.

Thus, recently, in 3GPP, eICIC (enhanced inter-cell interference coordination) has been actively researched as an interference cooperation method.

The time division scheme introduced to LTE Release-10 is called an enhanced ICIC (Enhanced inter-cell interference Coordination) in that it has been advanced compared with the existing frequency division scheme. According to the time division scheme, a cell causing interference is defined as an aggressor cell or a primary cell, an interfered cell is defined a victim cell or a secondary cell, and the aggressor cell or the primary cell stops data transmission in a specific subframe so that a UE may maintain connection with the victim cell or the secondary cell in the corresponding subframe. That is, in this method, when heterogeneous cells coexist, either cell temporarily stops signal transmission for a UE considerably interfered in a certain region and rarely transmits an interference signal.

A specific subframe in which the data transmission is stopped is called an almost blank subframe (ABS), and any data other than essential control information is not transmitted in the subframe corresponding to the ABS. The essential control information may be, for example, a cell-specific reference signal (CRS). In the current 3GPP LTE/LTE-A standard, the CRS signal exists in $0^{th}$, $4^{th}$, $7^{th}$, and $11^{th}$ OFDM symbols in a time axis. Thus, in the subframe as the ABS, only the CRS signal is transmitted on the $0^{th}$, $4^{th}$, $7^{th}$, and $11^{th}$ OFDM symbols.

In addition to the solution to the inter-cell interference problem through the eICIC technique as described above, a scheme of adding an interference removal capability to the UE 100 may be used.

The use of the interference removal capability may reduce inter-cell interference, and thus, coverage of a small cell may be expanded. Details thereof will be described with reference to FIG. 12.

Figure 12:
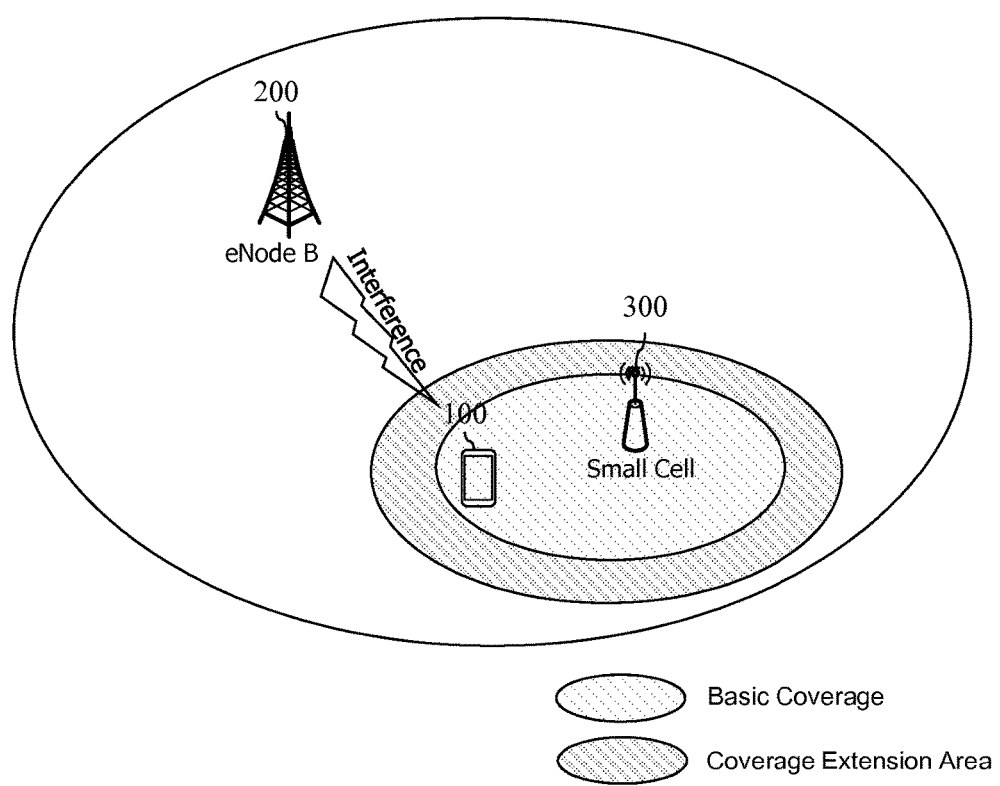
FIG. 12 is a view illustrating a concept of expanding coverage of a small cell according to an embodiment of the present disclosure.

FIG. 12 is a view illustrating a concept of expanding coverage of a small cell according to an embodiment of the present disclosure.

As illustrated in FIG. 12, when the UE 100 uses the interference removal capability, an effect of expanding a cell coverage or a cell radius of the BS 300 of a small cell may be obtained. In the drawing, an expanded coverage area larger than the basic coverage of the small cell 300 is indicated to be shaded. Such a coverage area may be called a cell range expansion.

By expanding the basic coverage of the small cell 300 using the interference removal capability of the UE 100, an effect of offloading traffic to the small cell 300 may be obtained.

In other words, when the interference removal capability of the UE 100 is used, even though strength of a reference signal received from the small cell is not greater than strength of a reference signal received from the macro cell by more than a threshold value, handover to the small cell may be performed.

Hereinafter, a scheme of adding the interference removal capability will be described.

Figure 13:
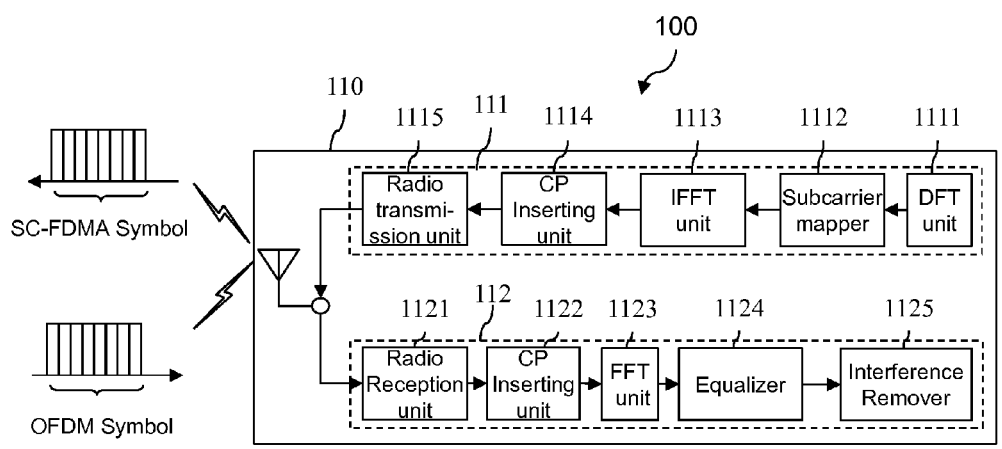
FIG. 13 is a block diagram illustrating a structure of a UE according to an embodiment of the present disclosure.

FIG. 13 is a block diagram illustrating the structure of UE according to one embodiment of the present specification.

In LTE or LTE-A, OFDM is used for a downlink and SC-FDMA similar to OFDM is used for an uplink.

SC-FDMA may also be referred to as discrete Fourier transform (DFT)-spread OFDM (DFT-s OFDM). When SC- is used, non-linear distortion of a power amplifier may be avoided, thus improving transmission power efficiency in a power consumption-limited terminal. Accordingly, user throughput may be enhanced.

SC-FDMA is substantially similar to OFDM in that SC-FDMA transmits signals via separate subcarriers using a Fast Fourier transform (FFT) and inverse FFT (IFFT). A conventional OFDM transmitter has a problem that signals in respective subcarriers on the frequency axis are converted into signals on the time axis by IFFT. That is, IFFT is a scheme of performing the same operation in parallel, and thus peak-to-average power ratio (PAPR) increases. To prevent increase in PAPR, SC-FDMA performs IFFT after DFT spreading, unlike OFDM. That is, a transmission mode in which IFFT is performed after DFT spreading is defined as SC-FDMA. Further, SC-FDMA is also referred to as DFT spread OFDM (DFT-s-OFDM).

SC-FDMA secures robustness to a multipath channel due to a similar structure to OFDM and basically resolves a disadvantage of conventional OFDM that is increase in PAPR by IFFT, thereby allowing efficient use of a power amplifier.

Figure 15:
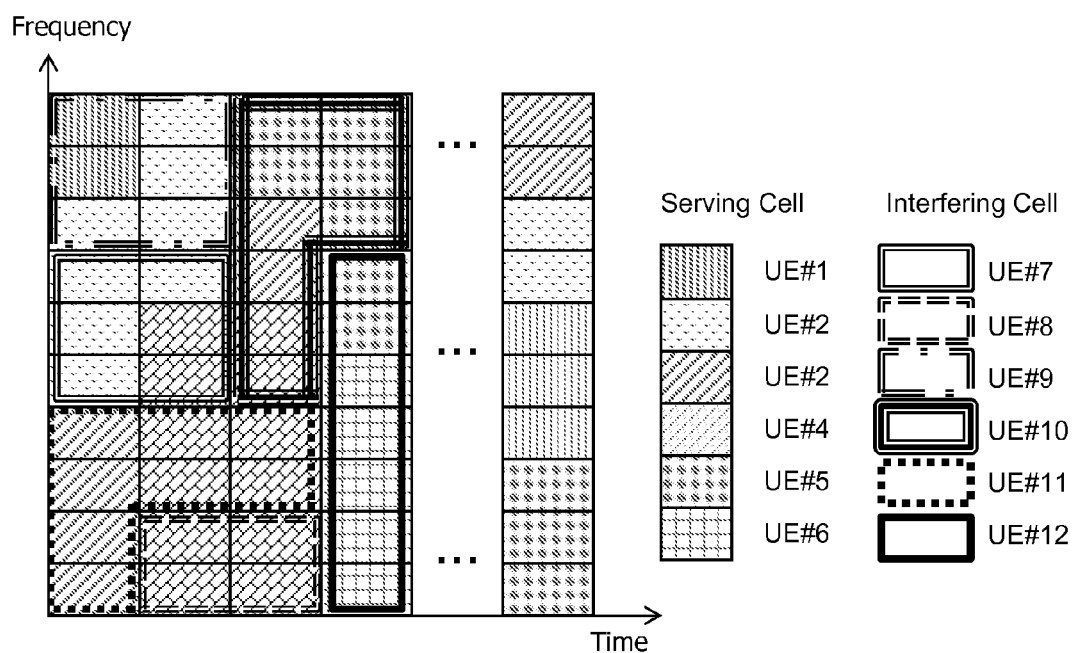
FIG. 15 is a resource block diagram illustrating how complicated interference cancellation with respect to PDSCH is.

Referring to FIG. 15, the UE 100 includes a radio frequency (RF) unit 110. The RF unit 110 includes a transmitter 111 and a receiver 112. The transmitter 111 includes a discrete Fourier transform (DFT) unit 1111, a subcarrier mapper 1112, an IFFT unit 1113, a cyclic prefix (CP) insertion unit 1114, and a wireless transmission unit 1115. The transmitter 111 of the RF unit 110 may further include, for example, a scramble unit, a modulation mapper, a layer mapper, and a layer permutator, which may be disposed before the DFT unit 1111. That is, as described above, to prevent increase in PAPR, the transmitter of the RF unit 110 subjects data to the DFT unit 1111 before mapping a signal to a subcarrier. The signal spread (or precoded) by the DFT unit 1111 is mapped onto a subcarrier by the subcarrier mapper 1112 and subjected to the IFFT unit 1113 into a signal on the time axis.

That is, in SC-FDMA, unlike OFDM, PAPR of a signal in the time domain obtained via the IFFT unit 1113 is not substantially increased by correlations between the DFT unit 1111, the subcarrier mapper 1112, and the IFFT unit 1113, thereby providing favorable transmission power efficiency. That is, in SC-FDMA, PAPR or cubic meter (CM) may be decreased.

The DFT unit 1111 performs DFT on input symbols to output complex-valued symbols. For example, when Ntx symbols are input (here, Ntx is a natural number), DFT has a size of Ntx. The DFT unit 1111 may be referred to as a transform precoder. The subcarrier mapper 1112 maps the complex-valued symbols onto respective subcarriers in the frequency domain. The complex-valued symbols may be mapped onto resource elements corresponding to resource blocks allocated for data transmission. The subcarrier mapper 1112 may be referred to as a resource element mapper. The IFFT unit 1113 performs IFFT on the input symbols to output a baseband signal for data as a signal in the time domain. The CP insertion unit 1114 copies latter part of the baseband signal for data and inserts the latter part in front of the baseband signal for data. CP insertion prevents inter-symbol interference (ISI) and inter-carrier interference (ICI), thereby maintaining orthogonality even in a multipath channel.

Meanwhile, the 3GPP is actively carrying out standardization of LTE-Advanced, evolving from LTE, for which clustered DFT-s-OFDM allowing non-contiguous resource allocation is adopted.

Clustered DFT-s-OFDM is a modification of existing SC-FDMA, which divides data symbols having been subjected to a precoder into a plurality of sub-blocks and separately mapping the sub-blocks in the frequency domain. An important feature of clustered DFT-s-OFDM allows frequency selective resource allocation to deal with a frequency selective fading environment in a flexible manner.

Here, clustered DFT-s-OFDM adopted as an uplink access mode for LTE-Advanced allows non-contiguous resource allocation, unlike SC-FDMA as an uplink access for LTE, and thus transmitted uplink data may be divided into a plurality of cluster units.

That is, the LTE system is configured to maintain a single carrier characteristic in an uplink, whereas the LTE-A system allows non-contiguous allocation of DFT-precoded data to the frequency axis or simultaneous transmissions of a PUSCH and PUCCH.

Meanwhile, the receiver 112 of the RF unit 110 includes a wireless reception unit 1121, a CP cancellation unit 1122, an FFT unit 1123, an equalizer unit 1124, and an interference cancellation unit 1125. The wireless reception unit 1121, the CP cancellation unit 1122, and the FFT unit 1123 of the receiver perform reverse functions of the wireless transmission unit 1115, the CP insertion unit 1114, and the IFFT unit 1113 of the transmitter 111.

The interference cancellation unit 1125 cancels or relieves interference included in a received signal.

The interference cancellation unit 1125 is added for dealing with an explosively increasing demand for radio data and for canceling interference as in FIG. 12.

Figure 14:
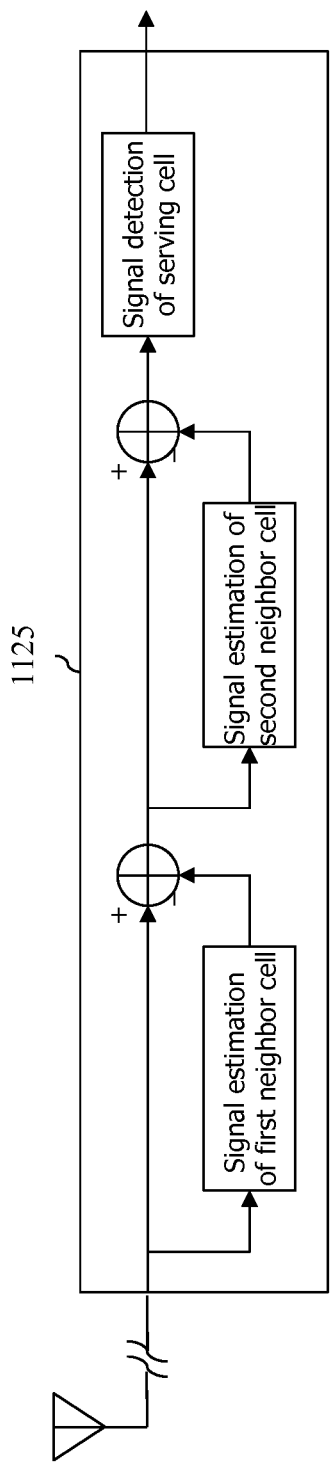
FIG. 14 is a block diagram illustrating an operation of an interference cancellation unit illustrated in FIG. 13.

FIG. 14 is a block diagram illustrating operations of the interference cancellation unit shown in FIG. 13.

The receiver 112 additionally including the interference cancellation unit 1125, which is called an interference cancellation (IC) receiver or interference rejection combiner (IRC) receiver, is configured to subtract an interference signal from a received signal.

Here, complexity of the receiver additionally including the interference cancellation unit 1125 depends on a maximum number of cells as an interference cancellation target and kinds of signals to be cancelled. FIG. 14 illustrates operations of performing interference cancellation of up to two interference sources.

When the interference removal capability is used as described above, an area up to 6 dB may be expanded, that is, cell range extension (CRE) may be possibly performed.

A signal as a target of interference removal may be a basic physical CRS (Cell specific Reference Signal), PBCH (Physical Broadcasting Channel), PSCH (Primary Synchronization Channel), or SSCH(Secondary Synchronization). Also, the signal as a target of interference removal may be a PDSCH (Physical Downlink Shared Channel) for user data transmission.

Here, the interference cancellation (IC) with respect to the CRS, the IC with respect to the PSCH, and the IC with respect to the SSCH may be implemented with relatively low complexity because the UE may know sequences for the CRS, the PSCH, and the SSCH in advance.

In contrast, in case of a channel in which certain information is transmitted, such as the PBCH and the PDSCH, a problem that the UE that wants to perform interference cancellation should received information transmitted in a corresponding channel in advance arises.

In particular, in the case of PBCH, transmission information, excluding a system frame number (SFN) is rarely changed, and the PBCH may be implemented with relatively appropriate complexity when a low coding rate, retransmission performed at the period of 40 ms four times, and application of a relatively simple channel coding are considered.

Meanwhile, the PDSCH uses various modulation coding schemes (MCSs) in addition to application of a turbo code, and when resource is scheduled between adjacent BSs, mutually different resource blocks (RBs) may be used. Thus, since there is a possibility that a plurality of PDSCH signals introduced from an interference cell are positioned in the RB positions allocated from a serving cell to the UE, the UE needs to decode a PDSCH that may exist for the entire RBs in order to perform IC.

FIG. 15 is a resource block diagram illustrating how complicated interference cancellation with respect to PDSCH is.

Referring to FIG. 15, RBs allcoated by a serving cell to UE#1~UE#6 are shown in different patterns, and RBs allocated by an interference cell to UE#7~UE#12 are shown in boxes.

For example, when UE#4 performs IC on a PDSCH received from an adjacent cell, decoding needs to be performed on PDSCH channels regarding UE#7, UE#8, UE#10, and UE#12 having RBs overlapping with the RBs allocated to UE#4 from the serving cell. Here, since UE#4 does not have information regarding the RB allocation of the interference cell, the UE#4 should perform blind decoding on the entire RBs, resulting in a significant increase in calculation.

This, in an embodiment of the present disclosure, adjacent BSs are forced to allocate the same mutually agreed RB to UEs positioned in a cell boundary, whereby a UE having an interference removal capability with respect to a PDSCH decodes only a single PDSCH with respect to one interference cell and regenerates an interference signal from the decoded PDSCH, thus significantly reducing complexity of the interference removal capability with respect to the PDSCH. Details thereof will be described with reference to FIG. 16.

Figure 16:
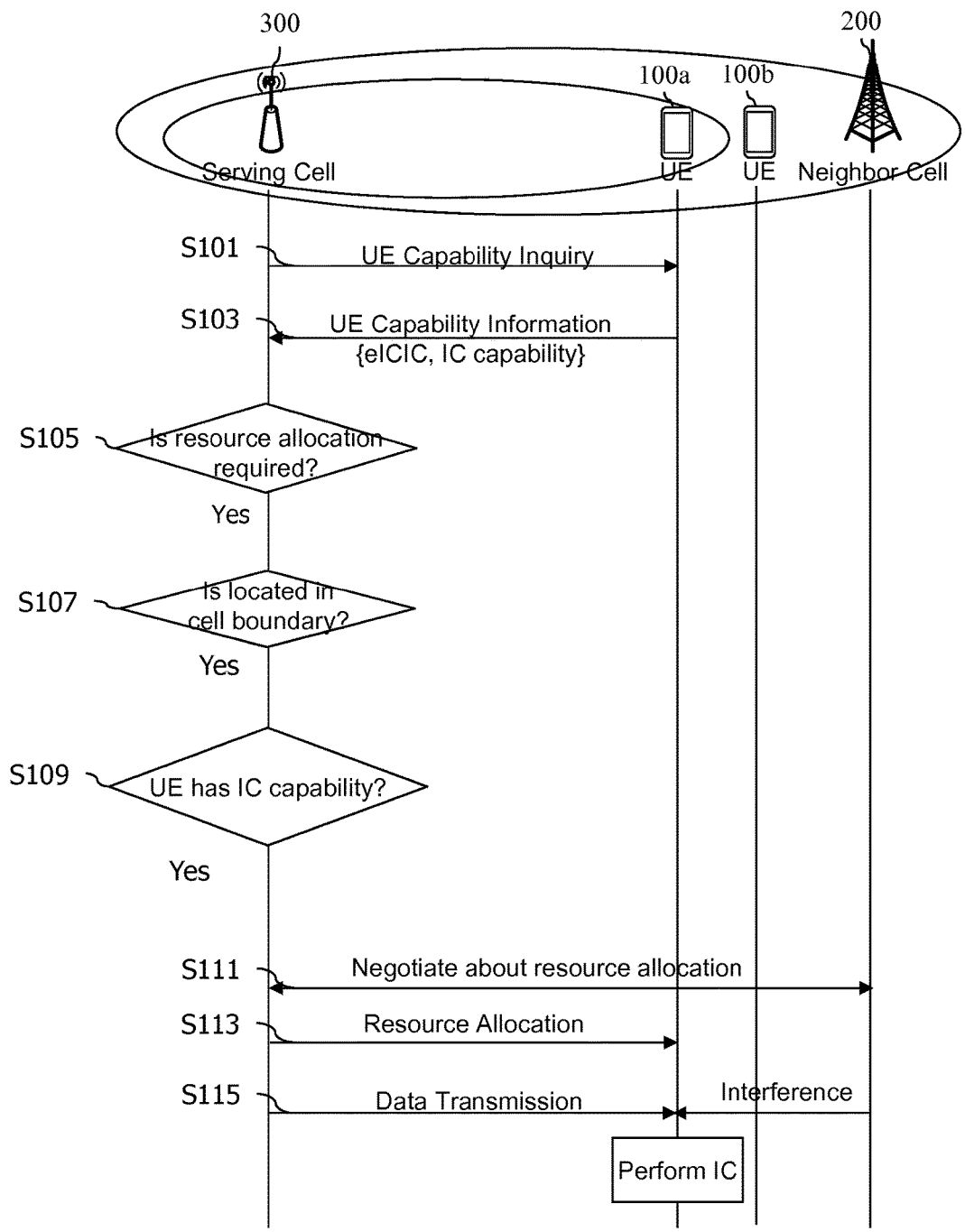
FIG. 16 is a signal flow chart illustrating a scheme according to an embodiment of the present disclosure.
Figure 17:
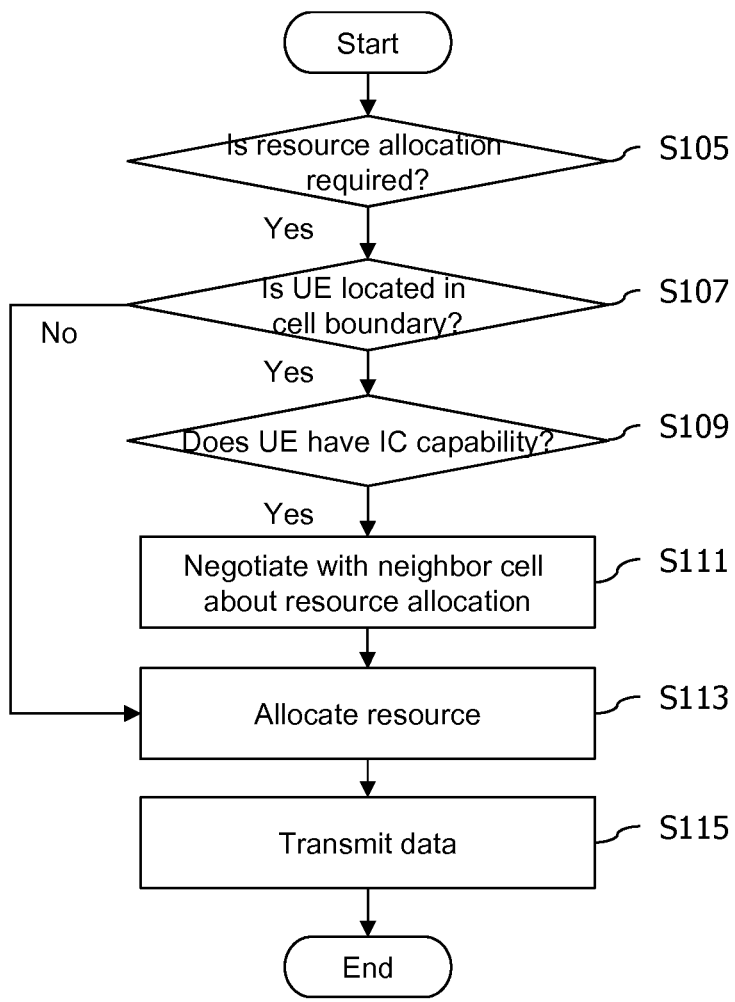
FIG. 17 is a flow chart illustrating a procedure of the scheme illustrated in FIG. 16.

FIG. 16 is a signal flow chart illustrating a scheme according to an embodiment of the present disclosure, and FIG. 17 is a flow chart illustrating a procedure of the scheme illustrated in FIG. 16.

In FIG. 16, it is illustrated that the small cell 300 is a serving cell and the macro cell 200 is an aggressor cell causing interference. However, the scheme according to an embodiment of the present disclosure may also be applied to a case in which the macro cell 200 is a serving cell and the small cell 300 is an aggressor cell causing interference. Also, the scheme according to an embodiment of the present disclosure may also be applied to a case in which both the serving cell and the aggressor cell are small cells or macro cells.

First, as illustrated in FIG. 16, the small cell 300, a serving cell, requests a UE 100a to check UE performance according to an instruction from a higher layer as necessary.

Then, the UE 100a provides UE capability information according to the request. That is, in response to the UE performance checking, the UE 100a informs the small cell 300 that the UE has an eICIC function and IC capability through UE capability information. On the other hand, when radio access performance of the UE 100a has been changed, a higher layer of the UE 100a may instruct a higher layer of the small cell 300 to make a performance checking request.

Meanwhile, the small cell 300, a serving cell, may check whether a neighbor cell, i.e., the macro cell 200, is an aggressor cell causing interference through exchanging information with the macro cell 200.

Thereafter, as illustrated in FIGS. 16 and 17, the small cell 300, a serving cell, determines whether resource is required to be allocated to the UE 100a (S105). When resource is required to be allocated, it means that there is downlink data to be transmitted to the UE 100a.

When resource is required to be allocated, the small cell 300, a serving cell, determines whether the UE 100a is located in the boundary (S107). Whether the UE 100a is located in the boundary may be known using RSRP/RSRQ/RSSI, or the like, received from the UE 100a. Alternatively, whether the UE 100a is located in the boundary may be known upon receiving location information of the UE 100a.

When the UE 100a is located in the cell boundary, the small cell 300 as a serving cell determines whether the UE 100a has an interference cancellation capability and activates the interference cancellation capability (S109). The determination may be performed using information obtained through checking UE capability information as described above.

When the UE 100a has a interference cancellation capability, the small cell 300 as a serving cell negotiates with the macro cell 200, an aggressor cell, about resource allocation (S111). Through the negotiation, the small cell 300 as a serving cell prevents radio resource overlapping with radio resource, which is to be allocated to the UE 100a, from being divided by the macro cell 200, an aggressor cell, and allocated to several other UEs.

When the negotiation is completed, the small cell 300 corresponding to the serving cell transmits information regarding the allocated radio resource to the UE 100a (S113).

Thereafter, the small cell 300 as a serving cell transmits downlink data (S115).

Here, as described above, if radio resource overlapping with the radio resource allocated to the UE 100a has been allocated to other UE 100b without being divided by the macro cell 200 as an aggressor cell, the UE 100a may effectively cancel interference due to data transmitted by the macro cell 200 as an aggressor cell to the other UE 100b (S115).

Meanwhile, the foregoing resource allocation negotiation step S111 may be performed differently according to whether the small cell 300 as a serving cell has priority over the corresponding radio resource or according to whether the macro cell 200 as an aggressor cell has the priority.

First, a case in which the small cell 300 as a serving cell has the priority over the corresponding radio resource will be described in detail.

The case in which the serving cell has the priority may be useful when it is difficult to change a position of an RB to be allocated to the UE 100a (for example, when a channel measurement is performed through a sub-band CQI, it is checked that the UE 100*a* undergoes deep fading so the serving cell determines that it is advantageous to allocate resource to a specific position).

Through the negotiation, the serving cell 300 transfers information regarding the radio resource to be allocated to the UE 100*a* 9 for example, information regarding the number of required RBs and positions of the RBs), and information regarding MCS to the macro cell 200 as an aggressor cell.

Then, when allocating resource, the aggressor cell 200 allocates resource only to the single UE 100*b* without dividing the resource, with respect to positions of the RBs reported from the serving cell 300.

Here, in a case in which a plurality of UEs appropriate for the RBs in the reported positions to be allocated thereto exist, the aggressor cell 200 preferentially select a UE having a lower MCS and allocates the RBs in the reported positions without dividing the RBs.

Also, in a case in which a plurality of UEs to which the same number of RBs as the number of reported RBs exist, the aggressor cell 200 may preferentially select a UE having a lower MCS and allocate the RBs without dividing the RBs, as possible.

Next, a case in which the macro cell 200 as an aggressor cell has the priority over the corresponding radio resource will be described in detail.

For the negotiation, the serving cell 300 transfers one or more of information regarding radio resource to be allocated to the UE 100*a* (for example, the number of required RBS) and information regarding MCS to the macro cell 200 as an aggressor cell. Here, with the serving cell 300, positions of RBs to be allocated to the UE 100*a* may not be important. This is may be a case in which the UE 100 measures a channel through a wide-band CQI and requests resource allocation, and the serving cell 300 allocates resource to a certain position.

Then, the aggressor cell 200 allocates the same number of RBs as that of the reported RBs to the single UE 100*b*, and transfers information regarding the positions and the number of the corresponding RBs to the serving cell 300.

Here, in a case in which a plurality of UEs, to which the same number of RBs as that of the reported RBs is required to be allocated, exist, the aggressor cell 200 may preferentially select a UE having a lower MCS and allocate the RBs without diving the RBs as possible.

Then, the serving cell 300 allocates the RBs in the same positions as those of the RBs reported from the aggressor cell 200, to the UE 100*a*.

When the resource allocation negotiation as described above is completed, since the RBs allocated to the UE 100*a* by the serving cell 300 have been allocated only to the single UE 100*b* by the aggressor cell 200, the UE 100*a* may need only decode only one PDSCH channel transmitted from the aggressor cell 200 to the UE 100*b* and cancels the interference accordingly, and thus complexity and calculation may be significantly reduced.

In this manner, in a case in which the serving cell 300 allocates resource to the UE 100*a* positioned in the cell boundary and having the PDSCH IC function, only one or less PDSCH is introduced all the time as interference from the aggressor cell 200 introduced to the allocated RBs. Also, when the UE 100*a* cancels interference of the PDSCH signal introduced from the aggressor cell 200 according to a decision feedback scheme through channel decoding, only one channel decoder is required, and thus, complexity of the PDSCH and corresponding power consumption may be reduced.

Also, the serving cell 200 may provide information regarding the PDSCH signal introduced from the aggressor cell 200 to the corresponding UE 100*a*. In this case, when the UE 100*a* drives the PDSCH IC through received resource allocation information, there is no need to perform blind decoding, reducing complexity. Also, interference from the aggressor cell 200 is always one or less, an thus, overhead of signal to provide the information may be reduced.

The embodiments illustrated above may be implemented by various instruments. For example, the embodiments of the present invention may be implemented by hardware, firmware, software, or combinations thereof, which will be described in detail with reference to FIG. 13.

Figure 18:
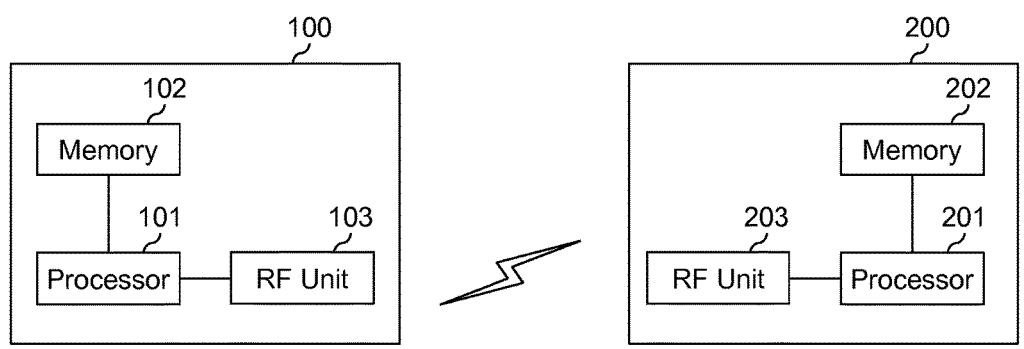
FIG. 18 is a block diagram illustrating a wireless communication system implementing an embodiment of the present disclosure.

FIG. 18 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The present invention may be used in a terminal, a base station, and other equipment of a wireless mobile communication system.

What is claimed is:

1. A method for resource allocation for supporting interference cancellation, the method performed by a serving cell and comprising:

determining whether a terminal has an interference cancellation capability; and when the terminal has an interference cancellation capability;

performing a negotiation for an allocation of resource blocks (RBs) with an interference cell; and allocating RBs to the terminal based on the negotiation, wherein the negotiation includes transmitting, to the interference cell, information on positions of the RBs allocated by the serving cell, and wherein the interference cell allocates its RBs, which are to be located in the same positions as the allocated RBs, to another single terminal without distributed allocation over a plurality of terminals.

2. The method of claim 1, further comprising:

determining whether the terminal is located in a cell boundary, performing the negotiation when the terminal is located in the cell boundary.

3. The method of claim 1, wherein the interference cell selects the another single terminal, which has a lowest level of modulation coding scheme (MCS).

4. The method of claim 1, wherein the negotiation further comprises:

transmitting, by the serving cell, information regarding the number of RBs to be allocated to the terminal, to the interference cell;

receiving, by the interference cell, information regarding positions of the RBs allocated by the same number to the another single terminal; and allocating the RBs present in the positions recognized by the received information to the terminal.

5. The method of claim 1, further comprising:

requesting, by the serving cell, the terminal to check capability information thereof; and receiving capability information from the terminal, wherein the received capability information includes information indicating whether the terminal has the interference cancellation capability.

6. A serving cell base station for allocating resource to support interference cancellation, the serving cell base station comprising:

a radio frequency (RF) unit; and a processor configured to control the RF unit, wherein the processor:

determines whether a terminal has an interference cancellation capability, and when the terminal has the interference cancellation capability;

performs a negotiation of an allocation of resource blocks (RBs) with an interference cell; and allocates resource blocks to the terminal based on the negotiation, wherein the negotiation includes transmitting, to the interference cell, information on positions of the RBs allocated by the serving cell base station, and wherein the interference cell allocates its RBs, which are to be located in the same positions as the allocated RBs, to another single terminal without distributed allocation over a plurality of terminals.

7. The serving cell base station of claim 6, wherein the processor:

determines whether the terminal is located in a cell boundary, and performs the negotiation when the terminal is located in the cell boundary.

8. The serving cell base station of claim 6, wherein the interference cell selects the another single terminal, which has a lowest level of modulation coding scheme (MCS).

9. The serving cell base station of claim 6, wherein, for the negotiation with the interference cell, the processor:

transmits information regarding the number of RBs to be allocated by the serving cell base station to the terminal, to the interference cell, receives information regarding positions of the RBs allocated by the same number to the another single terminal by the interference cell, and allocates the RBs present in the positions recognized by the received information to the terminal.

10. The serving cell base station of claim 6, wherein the processor:

requests the terminal to check capability information thereof, and receives capability information including information indicating whether the terminal has the interference cancellation capability from the terminal.

* * * * *